United States Patent [19]
Kirschling

[11] 3,762,522
[45] Oct. 2, 1973

[54] SELF-ADJUSTING CLUTCH OR BRAKE

[75] Inventor: Thomas J. Kirschling, Milwaukee, Wis.

[73] Assignee: Stearns Electric Corporation, Milwaukee, Wis.

[22] Filed: May 10, 1972

[21] Appl. No.: 251,893

[52] U.S. Cl. ............................ 192/111 A, 188/71.8
[51] Int. Cl. ............................................. F16d 13/75
[58] Field of Search ................... 192/111 A, 70.25; 188/71.8, 196 P

[56] References Cited
UNITED STATES PATENTS

| | | | |
|---|---|---|---|
| 2,888,109 | 5/1959 | Tankersley | 188/71.8 X |
| 2,421,757 | 6/1947 | Oetzel | 192/84 A |
| 3,391,768 | 7/1968 | Fixari | 192/111 A |
| 3,394,787 | 7/1968 | Fitzgerald | 192/111 A |

Primary Examiner—Benjamin W. Wyche
Attorney—Henry C. Fuller, Jr. et al.

[57] ABSTRACT

A clutch or brake with relatively movable friction surfaces is provided with an adjustable stop mechanism which includes position adjusting retainer rings to maintain a pre-determined air gap between the friction faces of the clutch armature and magnet frame when separated irrespecitve of wear. The retainer rings frictionally grip sleeves which are reciprocal between spaced stops on studs or pins fixed to the clutch hub and upon which the armature is reciprocable. The frictional grip of the retainer rings is overcome by the magnetic flux of the field magnet when energized to enable the armature to shift axially to an adjusted position on the sleeves to compensate for wear of the axially facing clutch friction surfaces. The one-way retaining rings maintain the armature at the adjusted position on the sleeves when the clutch is de-energized with the clutch faces at the pre-determined air gap.

4 Claims, 15 Drawing Figures

3,762,522

3,762,522

SELF-ADJUSTING CLUTCH OR BRAKE

BACKGROUND OF INVENTION

The present invention relates to self-adjustment of an armature in a clutch, brake or electromagnetic coupling to prevent an excessive air gap developing between the armature and magnet body due to wear of the friction surfaces. Various prior art U.S. Pat. such as Nos. 2,705,056; 2,705,058; 3,297,122; 3,394,787 disclose position adjusting devices for clutches and brakes. The present invention differs from the subject matter of these patents in that a change of position of the armature occurs when the grip of a friction positioning device is overcome when the clutch is energized.

SUMMARY OF INVENTION

The invention provides a position adjusting mechanism for the armature of a brake or clutch which functions as an adjustable stop to limit the travel of the armature into the de-energized position to maintain a constant air gap between the friction surfaces notwithstanding wear of these surfaces. The adjustment of the position mechanism occurs when the clutch is energized.

The position adjusting device of the invention includes parts, some of which shift axially with the clutch armature which is movable on one or more pins or studs which extend through apertures in the armature. The studs are secured to a portion of an armature hub which is splined to the armature plate. Sleeves extend through the apertures and are reciprocable on the studs between spaced stops comprising the hub portion and the stud head.

A retainer or lock ring with sleeve gripping elements is arranged around the sleeve and in one embodiment is fixed to the armature and in another embodiment abutting the armature. A spring arranged around the stud and the sleeve and between the retainer and the head on the stud biases the armature toward the de-energized position.

When the adjacent friction faces of the armature or clutch wear, and when the clutch is energized, shifting of the armature on the sleeve occurs after the sleeve engages the stop. If the friction faces are not engaged, the retainer is nudged on the sleeve a distance sufficient to enable the armature to engage the magnet body and thus limit the axial travel of the armature. Inasmuch as the retainer can only move in one direction, it maintains the armature at the adjusted position on the sleeve when the armature returns to the de-energized position and the armature remains at this position until wear causes the armature to nudge the retainer further on the sleeve.

Further objects, features and advantages of the present invention will become apparent from the following disclosure.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
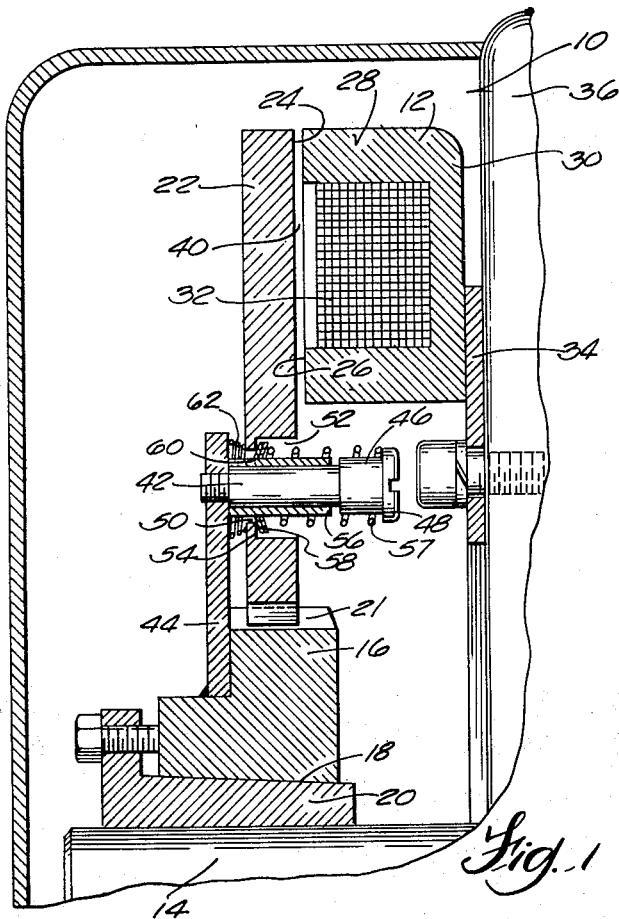
FIG. 1 is a fragmentary view partially in side elevation and partially in axial section of a clutch embodying the invention with the clutch armature in a de-energized position.

In the drawings, FIG. 1 discloses a clutch or brake generally designated 10. If the magnet frame or body 12 is stationary, the device constitutes a brake. If the magnet part 12 rotates, the device is a clutch. For convenience of illustration, the clutch as shown is used for braking purposes.

The part which is braked is the shaft 14 which carries a hub 16 having an inner periphery 18 which is complementary to a tapered sleeve 20. The hub 16 is splined at 21 to an armature 22 to carry the torque load and afford axial movement of the armature as well as rotation with shaft 14. The armature 22 has a friction clutch face 24 which is movable to and from engagement with the complementary face 26 of a clutch member 28, which is associated with a magnet frame 30 provided with a magnet winding or coil 32. A mounting plate 34 secures the magnet frame 28 to a stationary part 36.

When the winding 32 is energized, the magnetic flux flowing through the magnet body 28 draws the armature 22 and armature face 24 into contact with the face 26 of the magnet body 28 resulting in clutching or braking action. Whether the device is used as a clutch or brake, repetitive engagement of surfaces 24 and 26 results in wear of the friction faces 24, 26 and shown in FIG. 3.

The invention contemplates use of an adjustable stop to maintain the gap 40 between the adjacent surfaces 24 and 26 at a constant dimension. In the embodiment shown in FIGS. 1 to 4, the clutch includes one or more studs or guides 42 which are threaded into a plate 44 which is fixed to the hub 16. The studs have a shoulder 46 and a head 48 for purposes subsequently described. The studs extend through apertures 50 in the armature 22. Each aperture 50 includes a counterbore 52 with a shoulder 54. The position adjusting mechanism includes a sleeve or slide 56 which is arranged around the stud 42 and reciprocable between the plate 44 and the shoulder 46 on the stud 42, and one or more retainer rings 58 with sleeve gripping edges 60 which enable one-way movement of the retainer rings relative to the sleeve.

Figure 2:
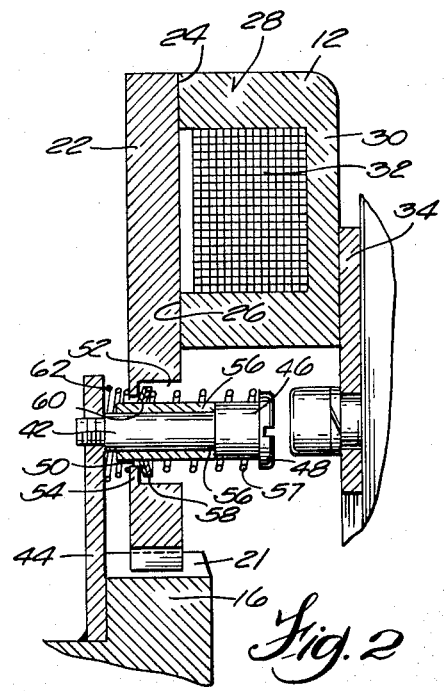
FIG. 2 is a fragmentary view similar to FIG. 1 showing the armature in the energized position engaging the magnet body.

To return the armature 22 from the energized position shown in FIG. 2 to the de-energized position shown in FIG. 1, spaced by the gap 40 from the clutch surface 26, the sleeve carries a spring 57 which is arranged around the sleeve and the shoulder 46 of the stud and located between the head 48 and a retainer 58.

Figure 3:
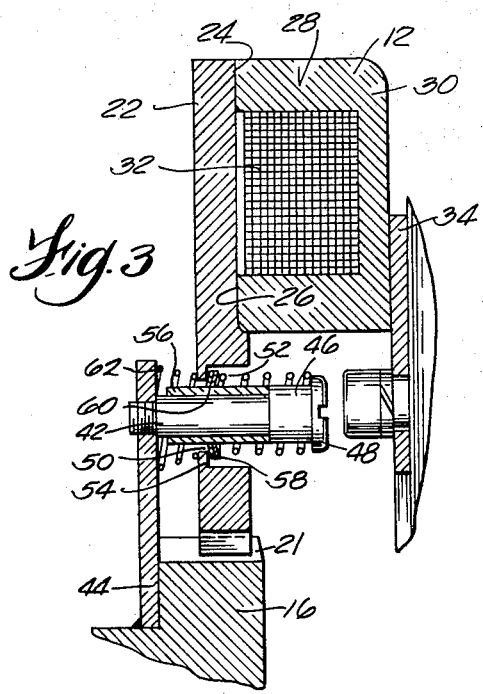
FIG. 3 is a view similar to FIG. 1 showing the adjacent surfaces of the armature and magnet body after wear and with the parts in the energized position.
Figure 4:
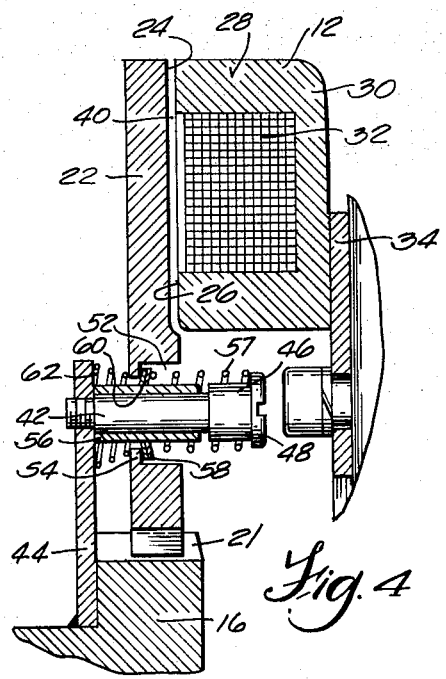
FIG. 4 is a view similar to FIG. 3 with the armature in the de-energized position with the armature at an adjusted wear compensating position.

The adjustment of the armature position relative to the sleeve 56 to compensate for wear is best shown in FIGS. 3 and 4, which show wear of both the surfaces 24 and 26 resulting from repetitive engagement of the surfaces.

If the armature face 24 does not engage face 26 when the clutch is energized and after the sleeve 56 abuts the stop or shoulder 46, the armature 22 will nudge the retainer 58 along the sleeve until the armature face 24 engages the magnet face 26. When the magnet is de-energized, the armature 22 is released to return to the de-energized position shown in FIG. 4 under the bias of spring 57. Movement of the armature 22 away from the magnet 28 occurs until the sleeve 56 engages the stop plate 44. A weak spring 62 holds the armature 22 against the retainer rings 58 to assure that the armature is maintained at the adjusted position. Inasmuch as the armature 22 has shifted axially to the right on the sleeve 56 as viewed in FIG. 4, the pre-set clearance or air gap 40 is maintained at the initial pre-set distance.

FIG. 5, 6, 7 and 8 disclose a modified embodiment of the invention in which the studs carry the torque load. The studs 70 are threadably anchored in a hub 72. The armature 74 is provided with a bushing or collar 76 provided with an aperture 78 and counterbore 80. A retainer ring 82 is securely anchored in the counterbore by a weld or taper lock 84. The retainer ring has a beveled edge 86 which grips a sleeve 88 located in the aperture 78. The retainer 82 affords one-way axial shifting of the armature 74 with respect to the sleeve 88 as with the previously discussed embodiment to compensate for wear and maintain the air gap 90 between the armature and the magnet body 92 at a uniform or constant spacing.

Figure 5:
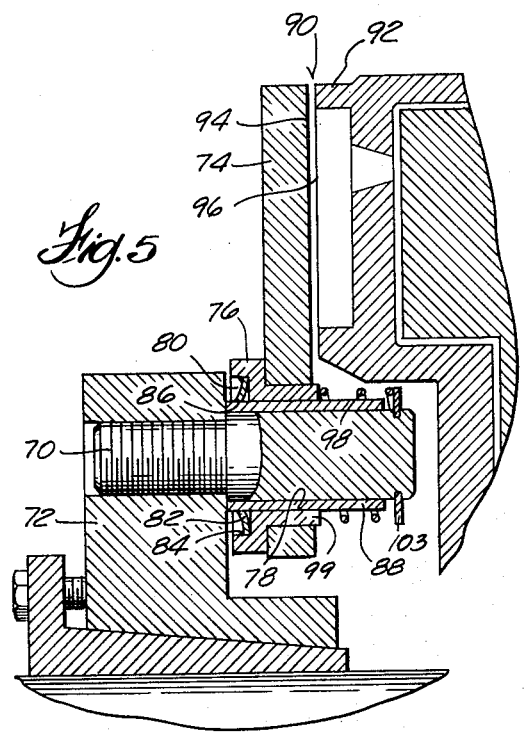
FIG. 5 is a fragmentary sectional view of a modified embodiment of the invention showing the armature in the deenergized position.
Figure 6:
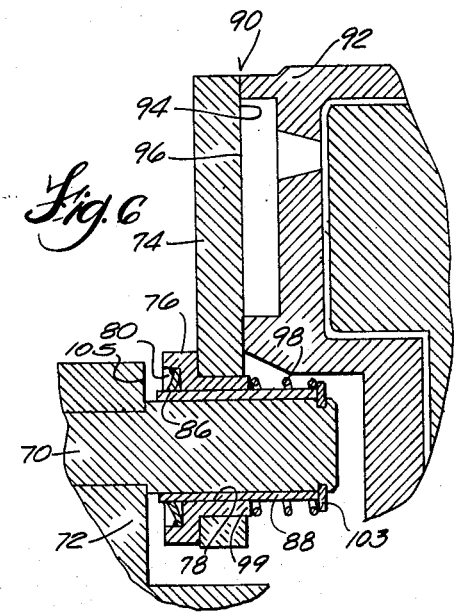
FIG. 6 is a view similar to FIG. 5 showing the armature in the energized position.

FIGS. 5 and 6 show the air gap 90 prior to any wear between the face 94 of the armature and face 96 of the magnet body 92. A spring 98 arranged around the sleeve 88 and located between a shoulder 99 on the bushing 76 and a stop 102 on the stud returns the armature 74 to the de-energized position shown in FIG. 5 from the energized position shown in FIG. 6.

Figure 7:
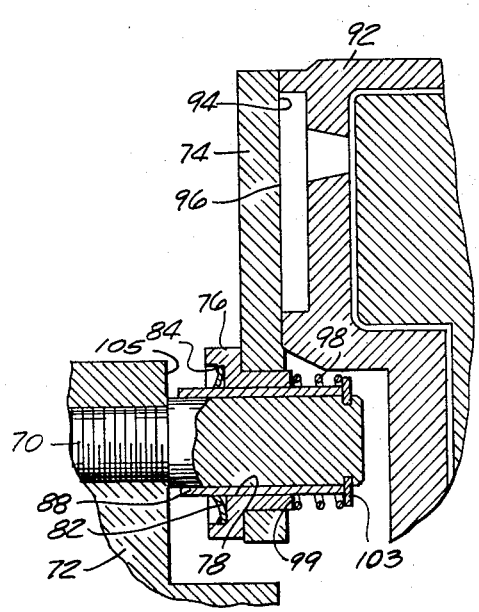
FIG. 7 is a view similar to FIGS. 5 and 6 with the armature in the energized position and showing wear of the adjacent surfaces of the armature and magnet body.
Figure 8:
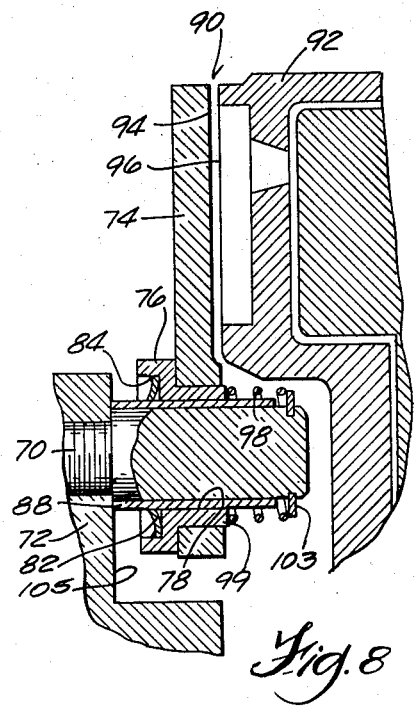
FIG. 8 is a view similar to FIG. 7 showing the armature in the de-energized position with the armature at an adjusted wear compensating position.

In FIGS. 7 and 8, the adjacent friction surfaces of the armature and magnet body respectively 94 and 96 have worn during use. When the clutch is energized, the armature will shift on the sleeve after the sleeve engages stop 103 until the surfaces 94, 96 engage. The movement of the armature with respect to the sleeve and the retainer will secure the armature on the sleeve at the adjusted position. When the clutch is de-energized and the armature 74 returns to the dis-engaged position, the armature shifts axially to the left as viewed in FIG. 8 until the sleeve 88 engages the shoulder 105 on the hub 72. The retainer 82 maintains the armature in the axially shifted position at a constant air gap 90.

FIGS. 9, 10, 11 and 12 disclose a further embodiment of the self-adjustment mechanism of the invention. In the embodiments shown in FIGS. 1–8, the studs or guides 42 and 70 are fixed to the hub, in the embodiment shown in FIGS. 9–12, the guide members, or pins 100 are threadably received in the armature 102, and move axially with the armature when the armature 102 is energized. The pin 100 has a head 104 and a shoulder 106 and is reciprocal through an aperture 108 in a guide plate 110 which is welded or otherwise secured to the hub 112.

As with the previous embodiments a sleeve 114 is arranged around and movable relative tto the pin 100. The sleeve also extends through the aperture 108 and carries retaining means 116 which bear against a beveled surface 118 of a washer 120. The beveled washer 120 can also be used with the embodiments of the invention disclosed in FIGS. 1–4 to minimize wear of the retainer ring teeth around the aperture in the armature. The self-adjust mechanism in FIGS. 9–12 also includes a strong spring 124 and a weak spring 126. The strong spring 124 keeps the retaining means 116 biased against the guide plate 110 and returns the armature 102 to the de-energized position with the armature 102 spaced from the magnet body 130 by a pre-determined gap 132.

Figure 10:
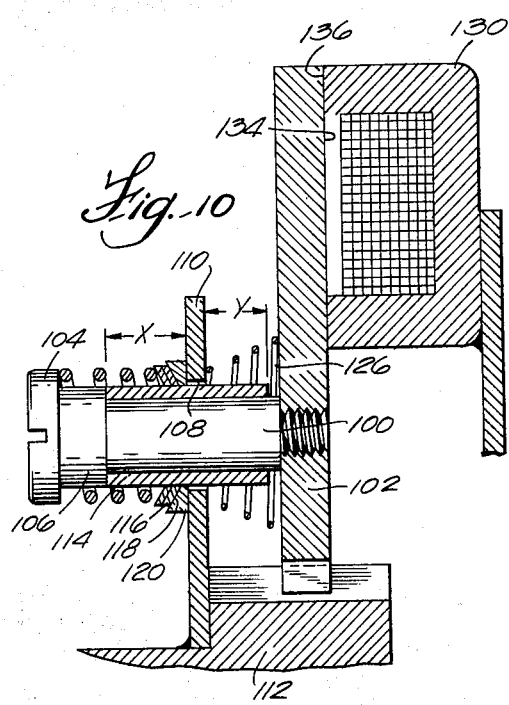
FIG. 10 is a view similar to FIG. 9 showing the armature in the energized position.
Figure 11:
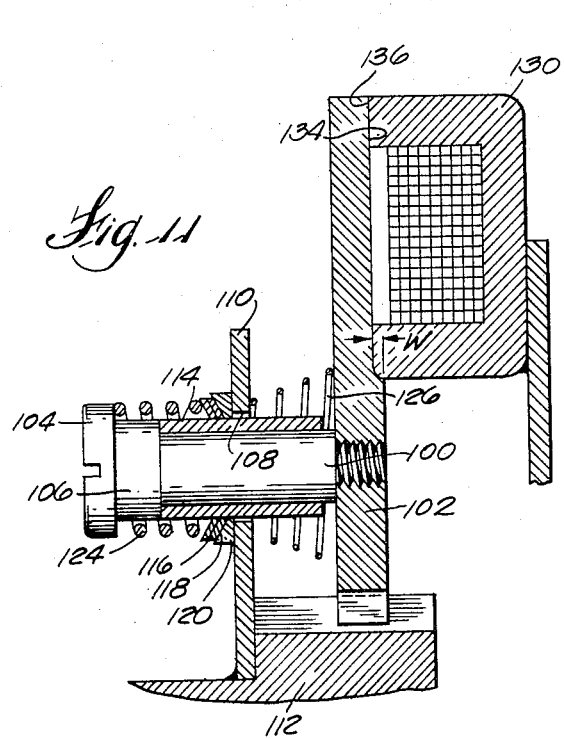
FIG. 11 is a view similar to FIGS. 9 and 10 showing wear of the adjacent surfaces of the armature and magnet body with the armature in the energized position.

FIG. 10 shows the armature in the energized position with the armature face 134 contacting the magnet body face 136. In FIG. 10 the length of the sleeve between the guide plate and the left end of the sleeve is shown with a measurement "X" and the distance between the guide plate and the right end of the sleeve is designated by "Y." In FIG. 11 the surfaces 134 and 136 have worn from repeated engagement during use. As the armature 102 moves to the right the distance "W" to compensate for the wear, the shoulder 106 on the pin 100 nudges the sleeve 114 through the retaining means a distance equal to the dimension "W."

Figure 9:
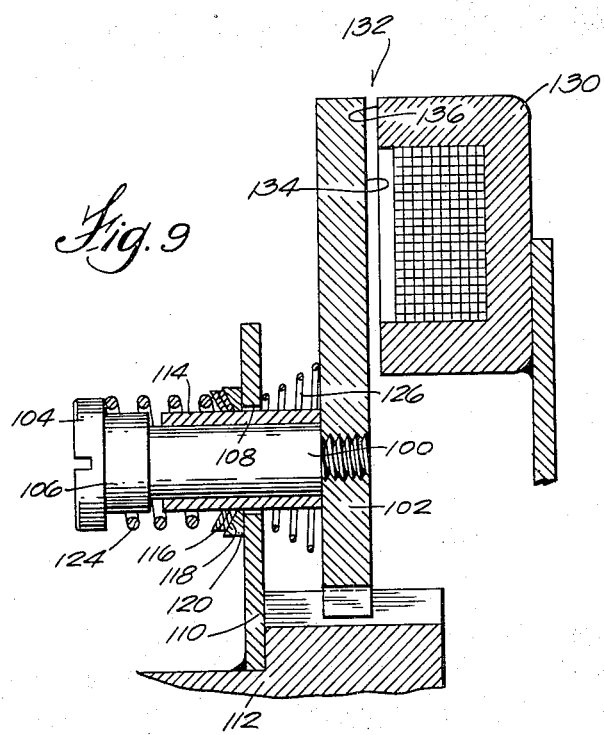
FIG. 9 is a fragmentary sectional view of a further modified embodiment of the invention showing the armature in the de-energized position.
Figure 12:
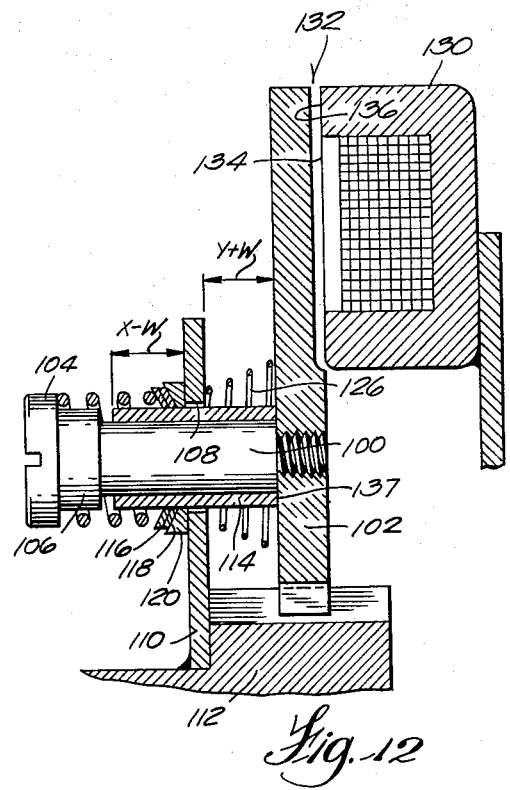
FIG. 12 is a view similar to FIG. 11 showing the armature de-energized with the armature at an adjusted wear compensating position.

FIG. 12 shows the armature 102 in the de-energized position with the gap 132 at the same dimension as shown in FIG. 9 prior to wear. The armature 102 moves as it de-energizes from the FIG. 11 to FIG. 12 position until it hits the end 137 of the sleeve. The weak spring 126 cooperates with the strong spring to insure that the armature stops at the adjusted position. The dimensions "X" and "Y" have been changed because of the adjustment that occured in FIG. 11 and the sleeve is now positioned with a dimension relative to the guide plate of "X" minus "W" to the left of the guide plate and "Y" plus "W" to the right of the guide plate.

Figure 13:
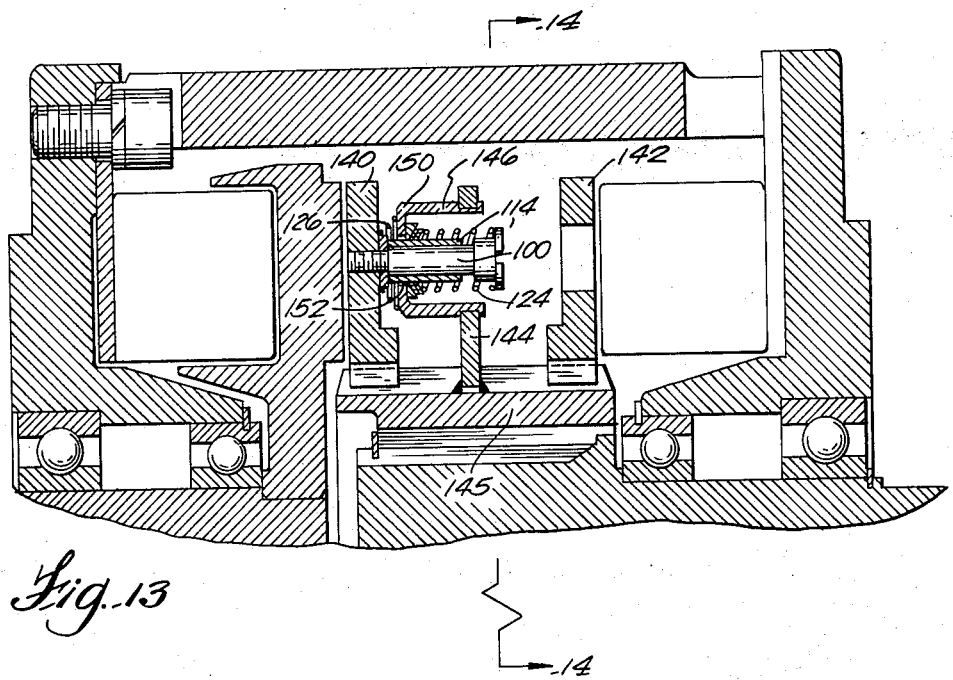
FIG. 13 is a fragmentary sectional view of a clutch structure having two armatures and a self-adjust mechanism of the type disclosed in FIGS. 9, 10, 11, and 12.
Figure 14:
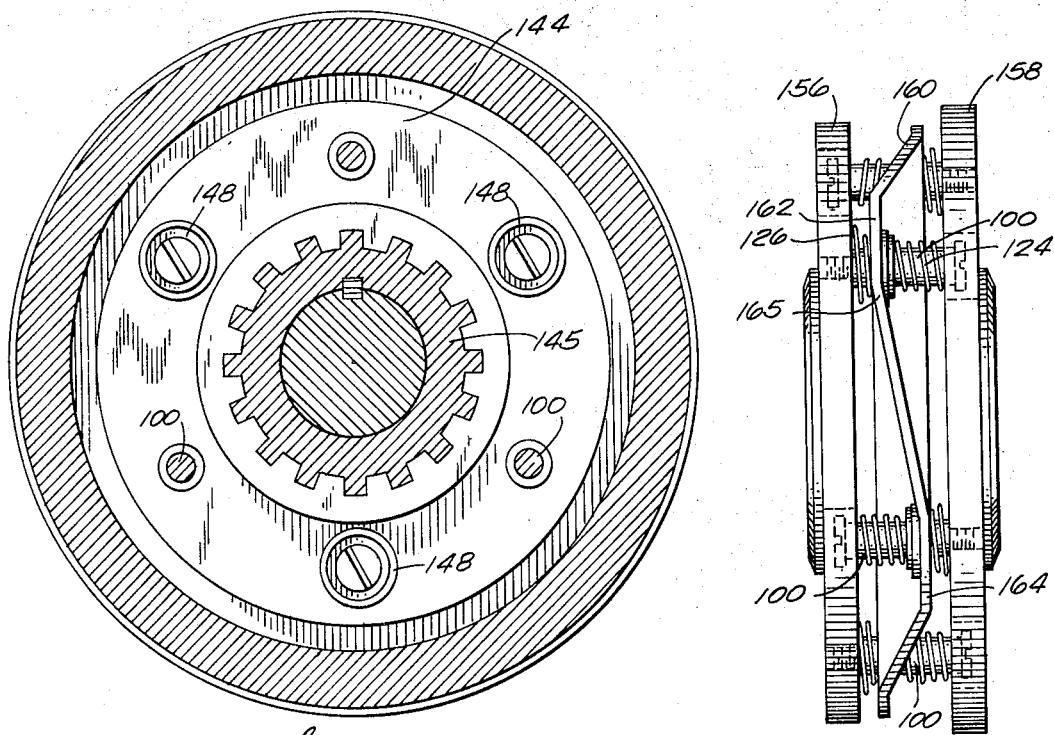
FIG. 14 is a reduced sectional view along line 14—14 of FIG. 13.

FIG. 13 shows a clutch structure having two armatures 140 and 142. The armature 140 can be employed to clutch the drive train and the armature 142 used as a brake. In FIG. 13 the guide plate 144 is located intermediate the armatures 140 and 142. The self-adjust mechanism shown in FIG. 13 is similar to the embodiment shown in FIGS. 9–12. The principal difference is the structure of the guide plate 144. In FIG. 13 the guide plate 144 is fixed to a hub 145 and includes three cup structures 146 which are circumferentially spaced around the guide plate 144 with bases 150 which are axially offset from the guide plate 144 for containing and guiding the self-adjust mechanisms for armature 140 which includes the pins 100. There are also three circumferentially spaced cups 148 (FIG. 14) facing the direction opposite those shown in FIG. 13 to contain and guide the pins 100 for the adjustment mechanism for the armature 142. The use of the cups 146, 148 with the axially offset bases 150 enables use of the same parts as shown in the embodiments of FIGS. 9–12 in a two armature clutch. Apertures 152 in the bases 150 of the cups receive the sleeve 114 and the pins 100 which are threaded into the armatures 140, 142.

Figure 15:
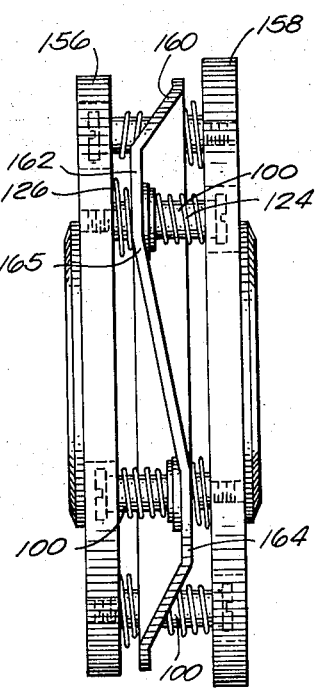
FIG. 15 is a fragmentary sectional view showing a modified form of the embodiment shown in FIG. 13.

In FIG. 15 a further embodiment is disclosed in which a clutch with two armatures 156, 158 includes a guide plate 160 which has a series of axially offset flat zones 162, 164 which are alternatively offset in opposite directions and which have apertures 165 for receiving the sleeve and stud as shown in FIG. 13.

I claim:

1. A self-adjusting clutch structure comprising a hub, first and second clutch members having opposed axially faced engagable friction surfaces spaced by a predetermined air gap when said clutch is de-energized, with said first member being movable relative to said hub to engage said second clutch member, a guide member having a stop shoulder, said guide member being fixed to said first member and movable with said first member, a guide plate connected to said hub and being axially stationary and having an aperture for receiving said guide member, a slide movable through said guide plate on said guide member between said stop shoulder and said first member, and retaining means frictionally engaged with said slide and said guide member having an abutment and a first spring arranged around and located exteriorly of the slide and said guide member and between said abutment and said retaining means to bias said retaining means against said guide plate and return said first clutch member to the de-energized position, said retaining means affording movement of said slide with said guide member and relative to said guide plate if required to cause engagement of said friction surfaces, with said retaining means maintaining said slide at an adjusted position relative to said guide plate when said clutch is de-energized to limit return movement of said first clutch member and maintain said first clutch member at said predetermined air gap.

2. A self-adjusting clutch structure in accordance with claim 1 wherein said first member is an armature and said clutch includes a second armature and said guide plate is located intermediate said armatures, said guide plate having surfaces alternatively axially offset in opposed directions, apertures in said offset surfaces and guide members extending through said apertures and fixed to said armatures.

3. A self-adjusting clutch structure in accordance with claim 2 wherein said axially offset surfaces comprise the bases of cup structures supported by said guide plate with said cup structures being open towards said guide plate and with said retaining means for each of said guide members being located within said cup structures.

4. A self-adjusting clutch structure in accordance with claim 1 including a second spring located between said guide plate and said movable clutch member.

* * * * *